United States Patent
Koul et al.

(10) Patent No.: US 12,368,802 B1
(45) Date of Patent: Jul. 22, 2025

(54) PLATFORM FOR CAMPAIGN MANAGEMENT USING GENERATIVE ARTIFICIAL INTELLIGENCE

(71) Applicant: Acqueon Inc., Irving, TX (US)

(72) Inventors: Ashish Koul, Southlake, TX (US); Ashok Raj Susairaju, Chennai (IN)

(73) Assignee: ACQUEON TECHNOLOGIES INC., Irving, TX (US)

( * ) Notice: Subject to any disclaimer, the term of this patent is extended or adjusted under 35 U.S.C. 154(b) by 0 days.

(21) Appl. No.: 18/658,999

(22) Filed: May 9, 2024

(51) Int. Cl.
   *H04M 3/51* (2006.01)

(52) U.S. Cl.
   CPC ....... *H04M 3/5108* (2013.01); *H04M 3/5191* (2013.01)

(58) Field of Classification Search
   CPC ............ H04M 3/5108; H04M 3/5191
   See application file for complete search history.

(56) References Cited

U.S. PATENT DOCUMENTS

| | | | |
|---|---|---|---|
| 8,126,134 B1 * | 2/2012 | Fama | G06Q 10/10 379/265.11 |
| 9,848,082 B1 * | 12/2017 | Lillard | H04M 3/53341 |
| 2024/0354567 A1 * | 10/2024 | Duggal | G06N 3/006 |

* cited by examiner

Primary Examiner — Amal S Zenati
(74) Attorney, Agent, or Firm — Galvin Patent Law LLC; Brian R. Galvin

(57) ABSTRACT

A system and method for outbound call campaign management model in a contact center using a generative artificial intelligence which processes prompts such as "Schedule a follow-up call with client X," understanding intent and context. Leveraging pre-trained language understanding, it interfaces with campaign components, scheduling calls or updating client information. The model dynamically adapts to varying scenarios, enhancing efficiency and personalization. The system employs secure interfaces, integrates with contact center tools, and undergoes continuous improvement through periodic retraining, ensuring optimal performance and compliance with evolving campaign requirements. Overall, it streamlines outbound call operations, automating actions and facilitating smoother interactions for a more productive and customer-centric contact center environment.

22 Claims, 8 Drawing Sheets

PLATFORM FOR CAMPAIGN MANAGEMENT USING GENERATIVE ARTIFICIAL INTELLIGENCE

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of call center technologies, and more particularly to the use of generative artificial intelligence for outbound call campaign management.

Discussion of the State of the Art

The current state of outbound call campaigns involves ongoing advancements in technology, data analytics, and customer engagement strategies. Artificial intelligence (AI) and advanced analytics are being integrated for predictive dialing, lead scoring, and personalized customer interactions. This approach enhances efficiency and customer experience. Additionally, there is a trend towards omni-channel integration, allowing outbound call campaigns to seamlessly connect with other communication channels such as email, SMS, and social media. This integration aims to provide a consistent and comprehensive customer experience.

Personalization and dynamic scripting have gained importance, enabling tailored conversations based on customer data. This trend leads to more relevant and engaging interactions, contributing to higher conversion rates and improved customer satisfaction. Compliance automation tools have also emerged to address regulatory challenges, ensuring adherence to data protection and privacy regulations like GDPR and TCPA.

Cloud-based solutions are increasingly adopted for outbound call campaigns, offering flexibility, scalability, and ease of integration. Real-time analytics and reporting dashboards are employed to monitor campaign performance, enabling data-driven decision-making.

Despite these advancements, challenges exist within the current state of outbound call campaigns. Compliance remains a significant concern, as staying abreast of evolving data protection and privacy regulations poses ongoing challenges. Overreliance on technology, especially AI, without adequate human oversight can result in misinterpretation of customer responses. Excessive outbound calls, even with personalization, can lead to customer fatigue and negative perceptions of the brand.

Limited personalization, integration challenges across communication channels, and data quality issues can impact campaign effectiveness. Ethical concerns regarding the perceived intrusiveness of outbound calls and the need to strike a balance between outreach and customer preferences also exist. Training and skill gaps among agents may hinder the full realization of technological advancements in outbound call campaigns.

This combination of regulatory compliance, customer happiness, and business success leads to a complex dynamic when creating, managing, and executing an outbound call campaign. The success of an outbound call campaign depends on factors such as targeting the right audience, employing effective communication strategies, and ensuring compliance with regulations. Organizations often use a combination of technology, analytics, and skilled agents to optimize their outbound call campaigns and achieve their specific objectives.

What is needed is system and method for providing a campaign co-pilot which can receive a request associated with an outbound call campaign and generate one or more actions to optimally satisfy the request.

SUMMARY OF THE INVENTION

Accordingly, the inventor has conceived and reduced to practice, a system and method for outbound call campaign management model in a contact center using a generative artificial intelligence which processes prompts such as "Schedule a follow-up call with client X," understanding intent and context. Leveraging pre-trained language understanding, it interfaces with campaign components, scheduling calls or updating client information. The model dynamically adapts to varying scenarios, enhancing efficiency and personalization. The system employs secure interfaces, integrates with contact center tools, and undergoes continuous improvement through periodic retraining, ensuring optimal performance and compliance with evolving campaign requirements. Overall, it streamlines outbound call operations, automating actions and facilitating smoother interactions for a more productive and customer-centric contact center environment.

According to a preferred embodiment, a system for outbound call campaign management using generative artificial intelligence is disclosed, comprising: a computing device comprising a processor, a memory, and a non-volatile data storage device; a campaign co-pilot service comprising a first plurality of programming instructions stored in the memory which, when operating on the processor, causes the computing device to: receive a prompt, the prompt comprising a request associated with an outbound call campaign; use the prompt as an input prompt for a generative artificial intelligence model configured to generate as output an action and a response; execute the action using a contact center system; and display the response on a user interface.

According to another preferred embodiment, a method for outbound call campaign management using generative artificial intelligence is disclosed, comprising the steps of: receiving a prompt, the prompt comprising a request associated with an outbound call campaign; using the prompt as an input prompt for a generative artificial intelligence model configured to generate as output an action and a response; executing the action using a contact center system; and displaying the response on a user interface.

According to an aspect of an embodiment, the response is text-based.

According to an aspect of an embodiment, the action is directed to the outbound call campaign.

According to an aspect of an embodiment, the action comprises at least one application programming interface (API) request, wherein the API request comprises a uniform resource locator generated by the generative artificial intelligence model, the model optionally using additional inputs from interface and configuration data maintained by the system.

According to an aspect of an embodiment, the API request comprises a uniform resource locator generated by the generative artificial intelligence model.

According to an aspect of an embodiment, the API request is delivered to the contact center system.

According to an aspect of an embodiment, the action is executed by the contact center system by fulfilling the API request.

According to an aspect of an embodiment, the generative artificial intelligence model is a trained large language model.

According to an aspect of an embodiment, the actions may be directed to administering one or more outbound campaigns to be executed via one or more of voice calls, text messages, emails, mobile pushes, and social media channel posts.

According to an aspect of an embodiment, the system further comprises a training module comprising a second plurality of programming instructions stored in the memory which, when operating on the processor, causes the computing device to: build a training dataset comprising a plurality of information related to at least outbound call campaigns and contact center components and systems; and use the training dataset as an input to a deep learning algorithm to create the generative artificial intelligence model.

According to an aspect of an embodiment, the contact center system is a campaign management system, a dialer system, a customer relationship management system, or a list management system.

BRIEF DESCRIPTION OF THE DRAWING FIGURES

DETAILED DESCRIPTION OF THE INVENTION

Figure 1:
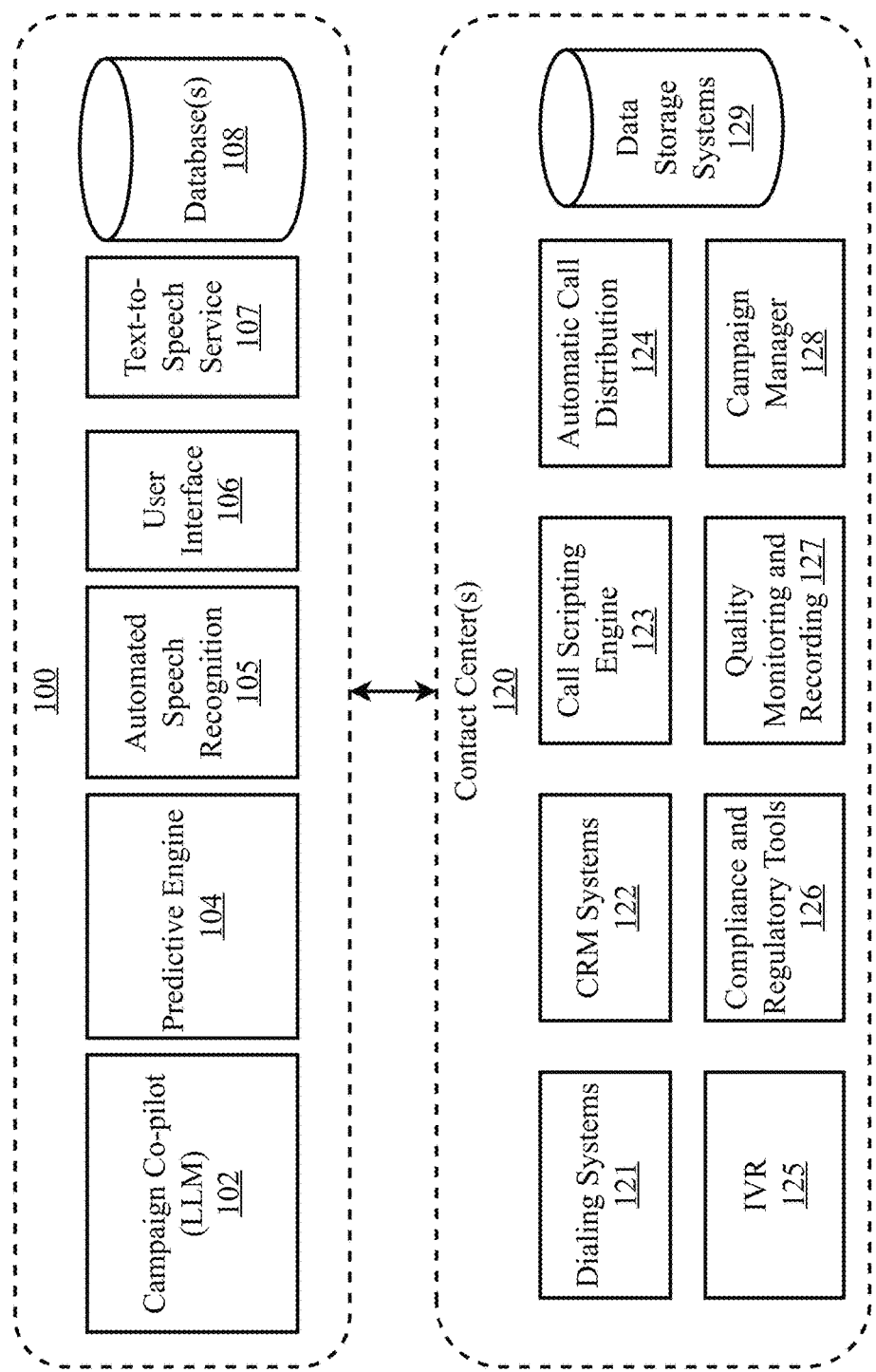
FIG. 1 is a block diagram illustrating an exemplary system architecture for a platform for campaign management using generative artificial intelligence, according to an embodiment.

The inventor has conceived, and reduced to practice, a system and method for outbound call campaign management model in a contact center using a generative artificial intelligence which processes prompts such as "Schedule a follow-up call with client X," understanding intent and context. Leveraging pre-trained language understanding, it interfaces with campaign components, scheduling calls or updating client information. The model dynamically adapts to varying scenarios, enhancing efficiency and personalization. The system employs secure interfaces, integrates with contact center tools, and undergoes continuous improvement through periodic retraining, ensuring optimal performance and compliance with evolving campaign requirements. Overall, it streamlines outbound call operations, automating actions and facilitating smoother interactions for a more productive and customer-centric contact center environment.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "Campaign Management System" (CMS) in a contact center is a software solution that helps organize, execute, and monitor outbound communication campaigns. Contact centers use these systems to efficiently manage large-scale outbound operations, such as telemarketing, sales, surveys, debt collection, and fundraising campaigns. Some key functions and features of a CMS in a contact center can include list management, automated dialing, scripting and call flow, call routing, monitoring and reporting, compliance and regulations, scheduling and queuing, integration with customer relations management systems, and workflow automation.

As used herein, a "dialer system" in a contact center is a software application or component that automates the process of making outbound calls to a list of phone numbers. The primary goal of a dialer system is to optimize the efficiency of outbound calling campaigns, improve agent productivity, and enhance overall contact center performance. There are different types of dialers, each serving specific purposes. Some common types of dialers include predictive dialers, power dialers, preview dialers, progressive dialers, and manual dialers.

As used herein, a "list management system" in a contact center is a software solution designed to efficiently organize, manipulate, and utilize contact lists for outbound communication campaigns. It plays a crucial role in optimizing the performance of campaigns by providing tools to manage and leverage contact data effectively. Some key functions and features of list management systems can include data import and integration, list segmentation, deduplication and cleansing, custom fields and data enrichment, list suppression, list prioritization, historical data analysis, integration with campaign management systems, and export and reporting.

Conceptual Architecture

FIG. 1 is a block diagram illustrating an exemplary system architecture for a platform for campaign management using generative artificial intelligence, according to an embodiment. According to the embodiment, platform 100 is configured to provide outbound call campaign management for one or more contact centers 120 via a campaign co-pilot 102 configured to receive a prompt comprising a request for assistance with an action associated with an outbound call campaign and execute, responsive to the prompt, one or more actions necessary to satisfy the request. According to the embodiment, platform 100 may further comprise a user interface 106 configured to provide an interface for platform users to submit a prompt to campaign co-pilot 102. In an embodiment, user interface 106 may be integrated into campaign co-pilot 102. The user interface may be configured to receive a prompt in a text format. In other embodiments, the user interface may allow for prompts to spoken and received in audio format. In such embodiments, platform 100 may further comprise an automated speech recognition system 105 configured to transform the audio prompt to a text format for further processing by campaign co-pilot 102. A text-to-speech (TTS) service 107 may also be implemented to convert written text into spoken words and may be used in various applications including but not limited to accessibility features for individual with visual impairments. In some implementations, TTS service 107 can be used to convert campaign co-pilot 102 responses from text to spoken words via its speech synthesis capabilities, wherein the response may be provided via speech to a platform user.

Platform 100 may further comprise one or more database(s) 108 configured to store a plurality of data including, but not limited to, historical prompt data (e.g., a database of all prompts that have been submitted to campaign co-pilot), model training data (e.g., training datasets, validation datasets, test datasets, etc.), one or more campaign co-pilot models, predictive models, application programming interface (API) configuration data, and other types of information useful for executing the request associated with a received prompt. The user interface may provide an interface for the campaign co-pilot 102 to receive prompts and provide actions/responses. This could be a REST API, a chat interface, or integration with an existing contact center software.

Also present in the embodiment is a predictive engine 104 configured to monitor contact center operations associated with, but not limited to, outbound call campaign management. Predictive engine 104 may monitor agent interactions, compliance and regulatory systems, call lists, dialing systems, scripting engines, and other contact center systems to identify potential issues and alert campaign co-pilot 102 to the potential issue. For example, predictive engine 104 may monitor for a low answer rate associated with an outbound call campaign because if a significant number of calls go unanswered, it can reduce the campaigns effectiveness. The predictive engine 104 may be configured to act when the low answer rate reaches a certain threshold. In such a case, predictive engine 104 can alert campaign co-pilot that a particular campaign has a low answer rate. Campaign-co-pilot 102 can, responsive to the alert, determine what the best course of action is. For example, campaign-copilot 102 could optimize calling hours (e.g., schedule calls during peak hours when people are more likely to answer) or use caller ID (e.g., ensure that the organization's name or a recognizable number appears on the caller ID). As another example, predictive engine 104 may identify a high call dropout rate, where people may answer but drop the call before engagement, and then alert campaign co-pilot 102 to the potential problem. Campaign co-pilot 102 may receive the alert (which may be provided to campaign co-pilot in the form of a prompt) and determine one or more remedies to apply to the outbound call campaign to address the identified issue. For example, if the case of high call dropout rate, campaign co-pilot 102 could: improve the script by generating a compelling script to grab attention quickly and provide value, optimize timing associated with the call campaign, or recommend agent training to improve call dropout rate.

In some implementations, predictive engine 104 may comprise a data collector configured to collect information at periodic intervals and send it to various endpoints and/or analyze it to make predictions about business or campaign outcomes. Some exemplary types of information that may be collected and analyzed can include a count of agents and their current presence information, number of calls abandoned, number of connect ratio, average handle time, average connect time, campaign details, agent allocation ratio for outbound. In some embodiments, a data collector of predictive engine 104 may be configured to integrate with one or more contact center systems/platforms and/or unified communication platforms via APIs and/or platform specific protocols (e.g., Java Database Connectivity as a Java-based API that allows Java applications to interact with relational databases). Predictive engine 104 may analyze collected data to predict or identify potential issues and then alert campaign co-pilot 102 about any identified issues.

In some implementations, predictive engine 104 may utilize one or more machine learning models configured to monitor the operation of a call center outbound call campaign and to make predictions about business outcomes.

The platform 100 may be located and operate on premises at a contact center, according to an embodiment. In another implementation, platform 100 may be a cloud-based service communicatively coupled with a contact center via a suitable communication network such as the Internet.

In some embodiments, platform 100 may further comprise an API manager configured to maintain and monitor the use of APIs for executing the actions generated by campaign co-pilot 102. The API manager may implement and manage access controls, authentication, and authorization mechanisms to secure API endpoints. Additionally, API manager can optimize API traffic by controlling request rates, enforcing quotas, and handling spikes in usage. In embodiments where an API manager is present, API manager may manage APIs associated with contact center components. For example, API manager may comprise an API for dialing systems 121, campaign management systems 128, list management systems, automated call distributors 124, CRM systems 122, and databases. In an implementation, campaign co-pilot 102 may generate an action, responsive to a prompt, wherein the action comprises an API request to an appropriate contact center component. For example, if campaign co-pilot received a prompt which indicated "Add 'Jane Doe' to dial list 'Special Guest'", then campaign-co-pilot can construct an API request to a database system to add Jane Doe to the existing Special Guest list.

Other implementations of platform 100 may not include an API manager. In these implementations, platform 100 may directly interface with APIs provided by contact center components. In such embodiments, campaign co-pilot 102 may construct and send API requests to the appropriate contact center API endpoint.

According to the embodiment, a contact center 120 may comprise one or more systems, subsystems, and/or services to facilitate the operation and function of a contact center environment. According to some embodiments, a contact center may comprise one or more dialing systems 121 (e.g., predictive and/or power dialers), customer relationship management (CRM) system 122 (e.g., integrating a CRM system allows agents to access customer data and interaction history, enabling personalized and informed conversations), call scripting software 123 (e.g., software configured to provide agents with scripts to help maintain consistency and ensure that key information is communicated during each call), automatic call distribution (ACD) systems 124 (e.g., ACD systems route calls to the most appropriate agent based on predefined criteria, such as skills, availability, or previous interactions), interactive voice response (IVR) systems 125 (e.g., IVR systems handle incoming calls by guiding callers through a series of prompts, directing them to the right department or providing self-service options), compliance and regulatory tools 126 (e.g., ensure adherence to regulations such as the Telephone Consumer Protection Act by implementing compliance tools that manage call hours, Do Not Call lists, and consent requirements), and quality monitoring and recording systems 127 (e.g., tools to monitor and record calls for quality assurance, training, and compliance purposes). These components are merely exemplary and are in no way limiting of the type of systems/processes that may be implemented in a contact center environment. In some embodiments, a contact center may have more or fewer components than what is illustrated in FIG. 1. In various embodiments, the components may be implemented as software, hardware, or some combination thereof.

An outbound call campaign serves various purposes depending on the goals and objectives of the organization running it. Some common actions and/or requests of outbound call campaigns which campaign co-pilot 102 can help with can include: sales and marketing; customer retention; market research; appointment setting; fundraising; debt collection; information dissemination; event promotion; survey and feedback; compliance calls; appointment reminders; subscription renewals; product recall notifications; customer education; lead nurturing; political campaigns; and cross-channel marketing.

Figure 2:
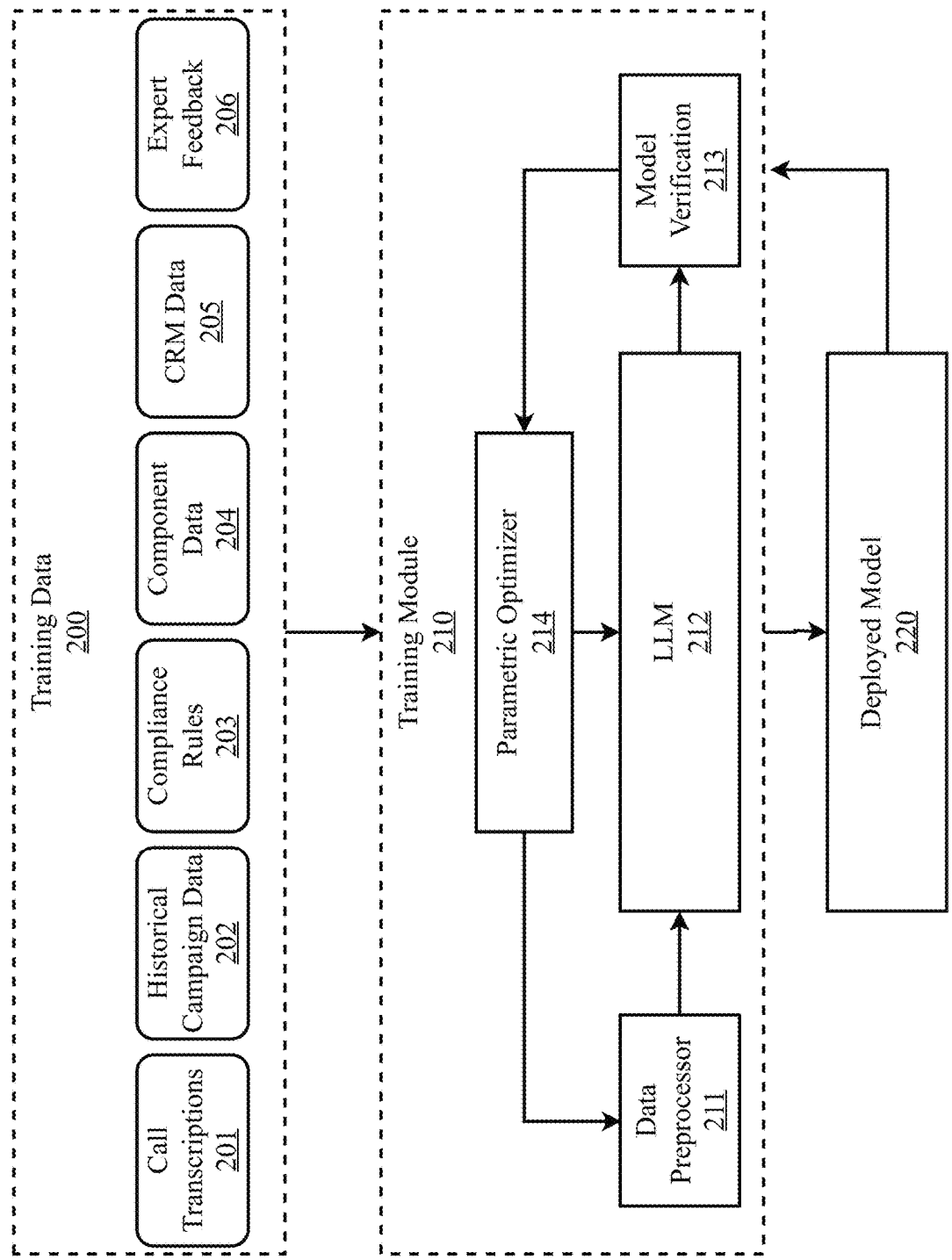
FIG. 2 is a block diagram illustrating a training module configured to train a generative artificial intelligence model to aid with the management of an outbound call campaign, according to an embodiment.

FIG. 2 is a block diagram illustrating a training module configured to train a generative artificial intelligence (AI) model to aid with the management of an outbound call campaign, according to an embodiment. According to the embodiment, the generative AI model may be trained via a training module 210 using a plurality of training data 200 including, but not limited to, call transcriptions, historical campaign data, compliance rules, component data, CRM data, and expert feedback. The generative AI model may be trained using a combination of supervised and unsupervised learning, dependent upon the embodiment.

According to a preferred embodiment, campaign co-pilot 102 may utilize one or more generative AI models configured to receive, understand, and parse a prompt associated with an outbound call campaign, and then execute on an action associated with the prompt based on the understanding by interfacing with the one or more appropriate outbound call campaign components (e.g., via API requests)

necessary to execute the action. In some embodiments, campaign co-pilot 102 may be implemented as one or more trained large language models (LLM). The LLM may be implemented using a suitable architecture known to those with skill in the art, some examples of which can include recurrent neural networks, long short-term memory, gated recurrent unit, transformer models, bidirectional encoder representations from transforms, generative pre-trained transformers, XLNet, T5, unified language model, and/or the like.

According to an embodiment, an LLM model 212 may be trained using a large corpus of training data 200 comprising information associated with the creation, management, and execution of an outbound call campaign.

Training data may comprise transcription data 201, wherein the transcription data comprises an interaction between a contact center and a customer. The interaction may be between a contact center agent and a customer, or between an automated system and a customer such as, for example, an interaction involving a customer engaging with an IVR system. The interaction may be any form of communication between a contact center and a customer including, but not limited to, a voice call, a video chat, a webchat, an email, a social media post, and/or the like. Transcription data may further comprise agent scripting data, comprising a plurality of call scripts, wherein the script serves as a conversational guide for an agent during an interaction. Scripts may be interaction specific. Scripts may be campaign specific. In this way, the underlying LLM of campaign co-pilot can learn to craft scripts based on specific conversational context, as well as create scripts that adhere to campaign constraints and can be used by an agent in an outbound call campaign.

Training data may comprise historical campaign data 202, wherein the historical campaign data comprises campaign attributes. According to an embodiment, campaign attributes may include purpose and objectives, target audience, data quality, compliance, script and messaging, agent training, technology and tools, performance metrics, timing and scheduling, follow-up processes, customer feedback, and channel integration, to name a few. The LLM can use the large corpus of historical campaign data to learn the important characteristics of various types of campaigns, the backend components required to execute the campaign, how to capture a campaign objective and create a campaign which aligns with that goal.

Purpose and objective data clearly define the purpose of a campaign (e.g., sales, lead generation, survey, etc.) and establish specific, measurable objectives to track the success of the campaign. For example, specific targets can include the number of sales, leads generated, or surveys completed. This information may be used by the LLM to learn the relationships between campaign goals, purpose, and structure, and how to establish criteria for measuring the performance of a campaign based on the campaign type. Target audience is another campaign attribute that may be included in model training data. Target audience attribute data is used to identify the specific demographic or customer segment that the campaign is targeting. The LLM model can learn to tailor messaging (e.g., interaction scripts) and approach based on the characteristics of the target audience.

Another campaign attribute is related to compliance and the applicable regulations associated with a campaign. Campaign attributes may indicate which local and/or international regulations the campaign must adhere to, such as GDPR, TCPA, or other privacy laws, to avoid legal and regulatory issues. Furthermore, compliance data may indicate opt-out options and DNC lists. According to some embodiments, model training data comprises a plurality of compliance rules and regulations. The compliance rules and regulations may comprise information associated with a regulation or law, a jurisdiction associated with the regulation or law, and one or more actions that must be performed to adhered to the regulation or law. For example, training data can include information about the Telephone Consumer Protection Act (TCPA) and its constraints, its jurisdiction is the United States, and actions such as obtaining express written consent, clearly communicate terms and conditions, only communicate during business hours, offer the consumer an opt-out, respect DNC lists and opt-outs, etc. In this way, the LLM model can learn about and comply with regulations governing outbound calls in different regions, such as obtaining proper consent and providing clear opt-out mechanisms for those who do not wish to be contacted.

Campaign attributes can include script and messaging information associated with a campaign. By including script and messaging information in the model training dataset, the LLM can learn to develop a well-crafted script that aligns with the campaign's goals and training points of interest to train agents on the script and encourage them to personalize their communication within the provided framework. The model is trained such that it can develop a script that guides the conversation while allowing agents to sound natural, but also considers message consistency to ensure that agents convey consistent messaging aligned with the campaign's goals.

Campaign attribute data may comprise information about the technology and/or tools necessary to execute the outbound call campaign. For example, most contact canters use a reliable CRM system to manage and track interactions, and implement predictive dialers or other tools to optimize efficiency. This information may be used by the LLM to learn about the relationships between a campaign and the various components within a contact center environment used to execute an outbound call campaign. This type of training data is useful for the LLM to be able to understand a prompt and connect it to the appropriate backend components (e.g., campaign manager, CRM system, database, dialer, ACD, list manager, etc.) necessary to fulfill the request or action associated with the prompt. For example, if campaign co-pilot 102 was given the prompt "Add contact 'Jane Doe' to dial list 'Special Guest'.", then the LLM would understand that it needs to create a database query to add Jane Doe to the existing list Special Guest stored in the database, the database query comprising a data write request to the appropriate database.

Campaign attribute data may further comprise performance metric information that define key performance indicators (KPIs) such as conversion rates, call duration, and lead qualification. These metrics may be used to gauge a campaign's success.

According to an embodiment, training data may comprise compliance rules 203. Compliance rules may refer to any laws or regulations that place rules on or otherwise restrict the interaction between a consumer and contact center. Examples of types of compliance rules that may be included in the training dataset can include, but are not limited to, the Telephone Consumer Protection Act (TCPA), Do Not Call regulations, General Data Protection Regulation (GDPR), Canadian Anti-Spam Legislation, Telemarketing Sales Rule, Privacy and Electronic Communications Regulations, personal data protection laws, and industry-specific regulations. By including this information in the training dataset, campaign co-pilot can learn about these regulations and how they impact an outbound call campaign. In this way, the LLM model can stay informed about the specific compliance rules relevant to a given call campaign and to implement processes and technologies that ensure adherence to these regulations. As regulations can change, the training data may be regularly updated to remain compliant.

According to some embodiments, training data may further comprise component data 204. Component data may comprise information associated with one or more components of a contact center such as, for example, an IVR system, an ACD, a dialer, a campaign manager, a list manager, and/or the like. For each component, there may be provided a plurality of information describing the operation and functionality of said component. For example, information can include operating state, version history, serial numbers, device identifiers (e.g., serial number, MAC address, etc.), operating system, system specifications, software information, network information, device/component features, security information, hardware information (e.g., model name and number, build configuration, etc.), and programming language and frameworks (e.g., information about the programming languages and frameworks used in the development of software on the device). The LLM may use this information to learn how to generate the proper commands in the appropriate language or framework for a given component.

In an embodiment, component data may comprise a component system development kit (SDK).

In some aspects, component data can further include data about one or more APIs which can be used to facilitate communication and data exchange between campaign co-pilot 102 and the various components of a contact center. Training data may include information about existing and/or available APIs for each of the components, as well as a framework information for the APIs. For example, the APIs may follow a Representative State Transfer (REST) framework and the LLM can learn to the set of principles and constraints that define how resources are identified, accessed, and manipulated over a stateless protocol. Every API comes with documentation that outlines its functionalities, endpoints, request methods, parameters, and authentication requirements, and this information can be included in the training data. This documentation provides a large corpus of information crucial for training campaign co-pilot on how to interact with the API. Campaign co-pilot 102 can use the API information to learn to generate API requests to the appropriate contact center endpoint responsive to a received prompt related to an outbound call campaign. For example, including API information in the training dataset can allow the model to understand the API documentation, obtain the appropriate API access credential, choose the right API endpoint, construct API requests (e.g., by specifying the method, endpoint, and any required parameters, creating a URL with the necessary information), include headers and authentication, and use API client libraries to make it easier to interact with the API.

In some embodiments, training data may comprise a plurality of API requests such as historical API request data collected in a contact center environment. In some implementations, each API request of the plurality of API requests may comprise information which indicates an action associated with the request, the action being directed to an outbound call campaign, and may further comprise a contact center component, system, and/or process that is the destination of the API request. This information may provide a corpus of training data which the LLM can use to learn to generate accurate and appropriate API requests responsive to a received input prompt.

Training data may further comprise a CRM data 205. CRM data refers to the information and records related to the interactions and relationships a business has with its customers. CRM data typically includes a wide range of information that can help campaign co-pilot 102 to better understand, track, and serve customers. Some common types of CRM data which may be included in the training dataset are contact information, communication history, sales and purchase history, lead and opportunity data, customer preferences, support and service requests, marketing interactions, social media interactions, and workflow and process data. Having access to this CRM data helps campaign co-pilot understand relationships between an organization and its customers. It allows campaign co-pilot 102 to make informed decisions, personalize interactions, and improve customer satisfaction.

According to the embodiment, training data may further comprise expert feedback 206. Generally, a senior employee of a contact center has a wealth of experience and knowledge with respect to outbound call campaign management, and this experience and knowledge may be captured by campaign co-pilot during model training. Training data may comprise a diverse dataset of prompts and corresponding actions. This dataset may include examples of the difference scenarios, edge cases, and potential user inputs. This data may be annotated by contact center experts/senior employees with the correct actions to create a supervised learning dataset.

According to the embodiment, the training module 210 may comprise a data preprocessor 211, one or more LLM models (or another type of generative AI model) 212, a model verification module 213, and a parametric optimizer 214.

At the training module 210, a plurality of training data 200 may be obtained. In some embodiments, the plurality of training data may be obtained from one or more database(s) and/or directly from various information sources such as a plurality of contact centers 120. Data preprocessor 211 may receive the training data and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 211 may tokenize and encode training data into a format suitable for training a language model. Data preprocessor 211 may also be configured to create training dataset, a validation dataset, and a test set from the plurality of input data 200. For example, a training dataset may comprise 80% of the preprocessed input data, the validation set 10%, and the test dataset may comprise the remaining 10% of the data. The preprocessed training dataset may be fed as input into one or more machine and/or LLM algorithms 212 to train a generative artificial intelligence configured to assist in the management and execution of outbound call campaigns in a contact center environment.

During training, the LLM model 212 produces training output which can be compared against a validation dataset to determine the model's performance. Training output may be captured by model verification module 213 and compared against a validation set to determine model performance. If the model's performance does not satisfy a criteria, then model parameters may be tuned to improve the model performance via a parametric optimizer 214. During this process a parametric optimizer 214 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, training module 210 provides a machine learning training loop. In an embodiment, the LLM model may be fine-tuned using an annotated dataset. This allows the model to adapt the specific domain and ensures it understanding the prompts associated with outbound call campaigns.

If a model satisfies the criteria during model verification, then it may be deployed in a production environment as a deployed model 220 wherein it may receive a request related to an outbound call campaign and generate an action(s) to be carried out by various contact center components to facilitate the request. The prompts received by the deployed model and the actions generated therein may be saved and used as additional training data in ongoing model training processes.

Detailed Description of Exemplary Aspects

Figure 3:
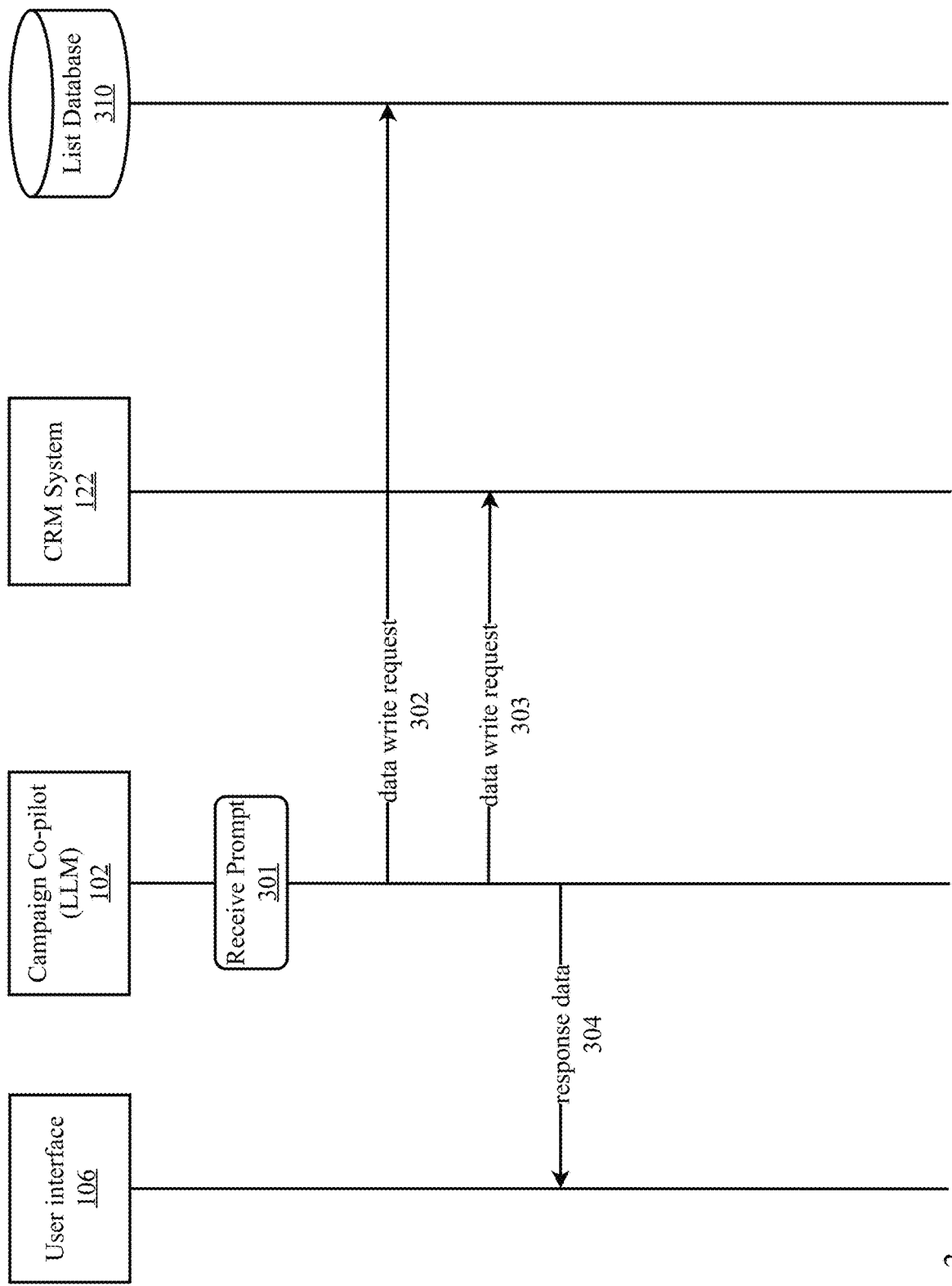
FIG. 3 is a message flow diagram illustrating an exemplary exchange of data and communications between a campaign co-pilot and various contact center components, according to an embodiment.

FIG. 3 is a message flow diagram illustrating an exemplary exchange of data and communications between a campaign co-pilot 102 and various contact center components, according to an embodiment. According to the embodiment, the process begins when a campaign co-pilot 102 receives a prompt 301 related to an outbound call campaign. The prompt may comprise a request and/or command related to an action to be performed related to an outbound call campaign. This may include, for example, scheduling calls, updating contact information, creating or updating contact lists, handling responses, generating scripts, creating campaigns, etc. Campaign co-pilot may process the prompt to determine one or more actions to take and generate a response to the prompt. The response may include one or more actions to be carried out by one or more contact center components, and may also include a text based response, such as the simple example of a confirmation message. In some implementations, the response may be communicated audibly using text-to-voice conversion systems known to those with skill in the art.

According to this exemplary embodiment, the prompt received is: "Add contact 'John Doe' to dial list 'Special Guest'." In this simple embodiment, the prompt is related to a request and/or command associated with the action of adding a contact to an existing call list. Campaign co-pilot 102 may be implemented as an LLM. In such embodiments, the LLM may receive this prompt and parse it into smaller units called tokens (e.g., words or subwords) such as ["Add", "'", "John", "Doe", "'", "to", "dial", "list", "'", "Special", "Guest", "'"]. Each token may then be embedded into a high-dimensional vector space. These embeddings capture the semantic meaning of the words and their relationships. The LLM has learned these embeddings during model training on a diverse dataset as described in FIG. 2. The model processes the tokens in a sequential manner, considering the context of the entire input. At each step, it updates its understanding of the prompt based on the preceding tokens. Given the context, the model generates the next token in the sequence. This process is repeated until the model predicts an end-of-sequence token or reaches a predefined maximum length. The generated token sequence is then decoded into natural language. In this case, it might be decoded as: Action ('Add', 'John Doe', 'Special Guest'). The decoded output is post-processed to extract relevant information. Thus, the LLM processes the prompt by tokenizing, embedding, contextualizing, generating, decoding, and post-processing to understand the underlying action.

Once an action is identified, Campaign co-pilot 102 can use its understanding of call campaign actions, contact center components and API documentation, as well as other information described herein, to generate one or more API requests and send it 302 to the appropriate contact center endpoint to execute the action. Continuing with the exemplary prompt, the API request is associated with a data write request to a list database 310, wherein the data write request is to add the contact John Doe to the existing Special Guest dial list. The list database 310 may be maintained by a list management system component of a contact center, and which may receive the API request. The LLM can learn the contact center component and system architecture during model training, and as a result it learns the appropriate endpoint (e.g., list manager or list database directly) associated with an action (e.g., add a contact to a dial list).

The exact structure of a data write API request to a database can vary depending on the type of database, the API specifications, and the programming language. However, provided is a simplified example using a scenario to write a person's name to a database through a RESTful API using JSON format. A basic API request might look like:

POST/api/special_guest
Content-Type: application/json
Authorization: Bearer FOO_ACCESS_TOKEN
{
　"firstName": "John",
　"lastName": "Doe"
}

In this example the API request is using the HTTP POST method, indicating to create a new resource (in this case, a person) on the server. The/api/special_guest represents the endpoint where the data will be written. The actual endpoint can vary based on the API design and the action to be taken responsive to a prompt. The headers indicate that the content of the request is in JSON format and if the API requires authentication, the access token is included there as well. The data to be written is included in the request body in JSON format. In this example, the person's name is represented by the firstName and lastName fields. The actual API request structure can depend on the specifications of the appropriate API. Additionally, the API request may include other fields or parameters required by the API for proper data validation or additional context. Campaign co-pilot 102 may refer to its learned associations related to the API documentation provided by the database and/or service/system in the contact center that campaign co-pilot 102 ma interact with to ensure that the generated API requests are formatted correctly and meeting any specific requirements.

In an alternative embodiment, wherein a CRM system 122 is present and which stores the dial list therein. Alternatively, campaign co-pilot 102 may generate an API request and send the request 303 to a CRM system 122. The structure of an API request to add a person to a dial list in a CRM system can vary based on the specific CRM system and its API design. However, a simplified example is provided assuming the use of a RESTful API with JSON format:

POST/api/dial-lists/add-person
    Content-Type: application/json
    Authorization: Bearer FOO_ACCESS_TOKEN
    {
      "dialListId": "special-guest",
      "person": {
      "firstName": "John",
        "lastName": "Doe",
        "phoneNumber": "555-1234"
      }
    }

In this example, the API request use the HTTP POST method to add data to the CRM system. The enpoint/api/dial-lists/add-person represents the endpoint specific to adding a person to a dial list. The actual endpoint may vary based on the CRM system's API design. The request body includes the necessary data to add a person to a dial list. It includes the dialListId identifying the specific dial list and the person object containing details such as firstName, lastName, and phoneNumber. This is a simplified example, and the actual requirements and fields may differ based on the CRM system's API specifications.

Campaign co-pilot 102 can be further configured to generate a response to the received prompt. The response may be a text-based response generated by a generative AI model and based on analysis and processing of the prompt. For example, the campaign-co-pilot may generate a response such as "I've added John Doe to the Special Guest list" or "John Doe is available for the Special Guest dial list" or other types of responses. A response may also include a follow-up message if campaign co-pilot needs more information to satisfy the prompt, or to ask the user if there is anything else they need assistance with. The generated response data 304 may be sent to a user interface 106 where it may be displayed and presented to the entity which submitted the prompt. The user interface 106 may include a display and means to provide input (prompts) to platform 100 such as a keyboard and mouse and/or a microphone and speech-to-text conversion systems. In this way, campaign co-pilot 102 may communicate with various contact center components to facilitate an action associated with a outbound call campaign and responsive to a received prompt.

Figure 4:
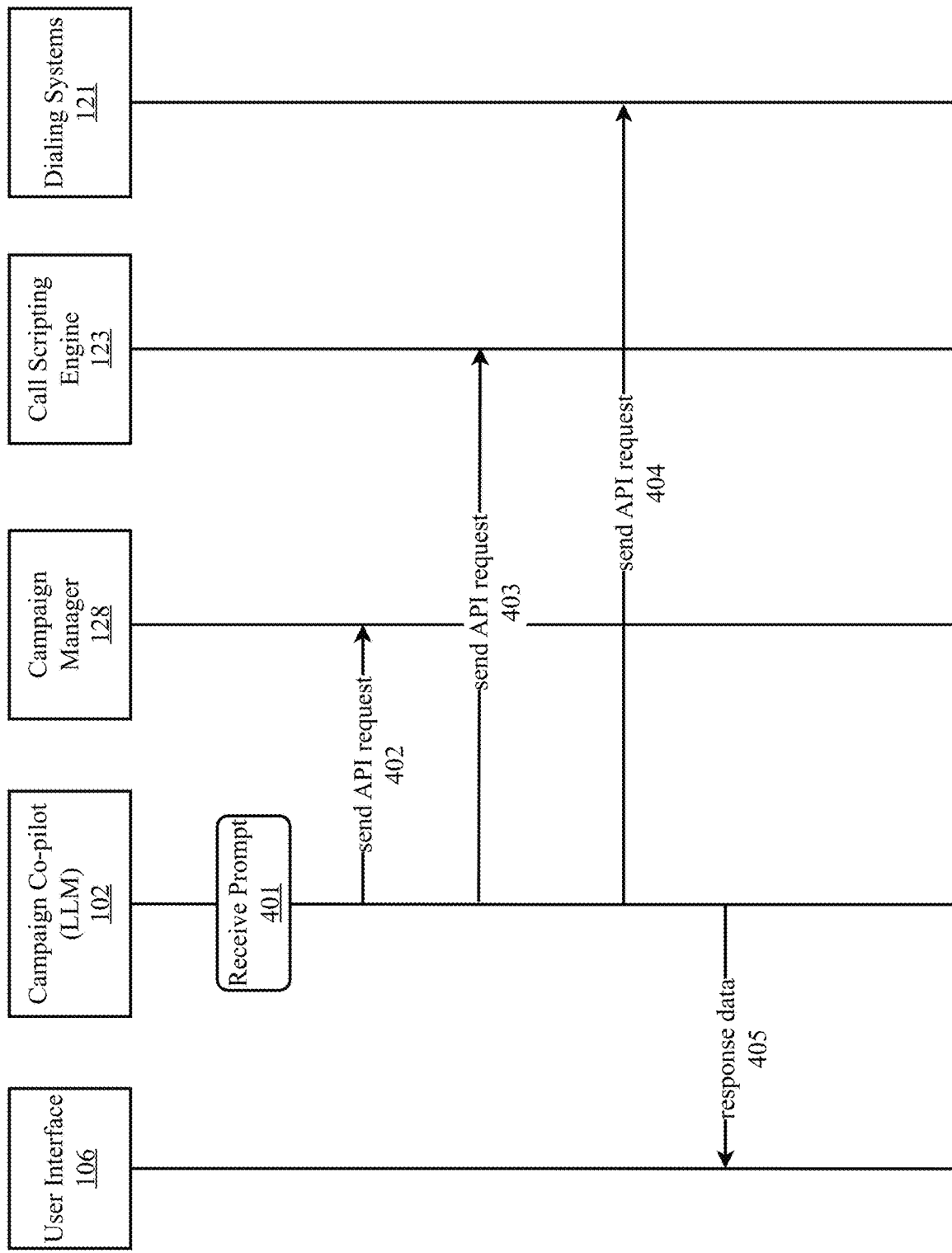
FIG. 4 is a message flow diagram illustrating an exemplary exchange of data and communications between a campaign co-pilot and various contact center components, according to an embodiment.

FIG. 4 is a message flow diagram illustrating an exemplary exchange of data and communications between a campaign co-pilot 102 and various contact center components, according to an embodiment. According to the embodiment, the process begins when a campaign co-pilot 102 receives a prompt 401 related to an outbound call campaign. The prompt may comprise a request and/or command related to an action to be performed related to an outbound call campaign. This may include, for example, scheduling calls, updating contact information, creating or updating contact lists, handling responses, generating scripts, creating campaigns, etc. Campaign co-pilot may process the prompt to determine one or more actions to take and generate a response to the prompt. The response may include one or more actions to be carried out by one or more contact center components, and may also include a text based response, such as the simple example of a confirmation message.

According to this exemplary embodiment, the prompt received is: "Create campaign named upgrade notification for December 2023. Call all customers in list North America on their phone to inform the platform will get upgraded to version 4.0 this Sunday between 1 AM and 3 AM and services might be interrupted. Start the campaign on Tuesday. Call customers between 8 AM eastern to 6 PM Pacific." Campaign co-pilot 102 may receive this prompt and parse it to identify one or more actions and/or commands contained therein. In this example, the identified action is to create a new outbound call campaign.

Once an action is identified, Campaign co-pilot 102 can use its understanding of call campaign actions, contact center components and API documentation, as well as other information described herein, to generate one or more API requests and send it 402 to the appropriate contact center endpoint to execute the action. Creating an API request for a campaign management system 128, especially one that involves specific details like targeting customers in a certain region and making phone calls during specific hours, will depend on the specific API specifications of the campaign management system integrated with platform 100. Provided is a generic example using HTTP POST with JSON:

POST /api/campaigns
    Content-Type: application/json
    Authorization: Bearer FOO_ACCESS_TOKEN
    {
      "name": "Upgrade Notification for December 2023",
      "startDate": "2023-12-05T00:00:00", // Start on Tuesday
      "endDate": "2023-12-05T23:59:59".
      "description": "Inform users about the upcoming upgrade to version 4.0.",
      "targetAudience": {
        "region": "North America",
        "contactMethod": "phone",
        "callHours": {
          "start": "08:00",
        "starttimezone": "Eastern",
        "end": "18:00",
        "endtimezone": "Pacific",
        }
      },
      "message": We're calling to inform you about the upcoming upgrade to version 4.0 this Sunday between 1AM and 3 AM. Services might be interrupted. Thank you for your understanding.",
      "channels": ["phone"],
      "campaignSpecificData": {

```
    "upgradeDetails": {
      "upgradeTime": {
        "start": "2023-12-10T01:00:00",
        "end": "2023-12-10T03:00:00",
        "timezone": "UTC"
      },
      "serviceInterruption": true
    }
  }
}
```

In this example, campaign co-pilot 102 generates the API request using the HTTP POST method to create a new campaign. The/api/campaigns represents the endpoint specific to creating campaigns. The actual endpoint may vary based on the campaign management system's API design. The request body includes specific details about the campaign. It specifies the name, startDate, and endDate of the campaign, a brief description, the targetAudience (including region, contact method, and call hours), the message to be delivered, channels through which the campaign will be conducted (phone calls), and campaignSpecificData providing details about the upgrade, including the upgrade time and potential service interruption. In this way, campaign manager 102 can facilitate the creation of the campaign as specified in the received prompt.

Additionally, campaign co-pilot may also generate and send an API request 403 to a call scripting engine 123. The API request may comprise a script generated by campaign co-pilot, wherein the script is to be associated with the call campaign created in the previous step. Creating an API request to a call scripting engine to include a new script for an outbound call campaign can vary depending on the specific scripting engine and API design. Below is a generic example using HTTP POST with JSON:

```
POST/api/call-scripts
Content-Type: application/json
Authorization: Bearer FOO_ACCESS_TOKEN
{
   "campaignId": "Upgrade Notification for December 2023",
   "scriptName": "Upgrade Notification Script",
   "scriptContent": "Hello, this is [AgentName] from [YourCompany]. We're calling to inform you about the upcoming upgrade to version 4.0 this Sunday between 1 AM and 3 AM. Services might be interrupted. Thank you for your understanding.",
   "variables": [
   {
     "name": "AgentName",
     "type": "text",
     "prompt": "Please enter your name:"
   },
   {
     "name": "YourCompany",
     "type": "text",
     "prompt": "Please enter your company name:"
   }
   ]
}
```

In this example, the API request uses the HTTP POST method to create a new call script. The request body includes details about the new script. It specifies the campaignId to which the script will be applied, the scriptName, scriptContent containing the actual script, and an array of variables that the script may use, each with a name, type, and optional prompt for user input. In this way, the call scripting engine 123 can deliver the generated script to the appropriate agents during the call campaign which was just created in the previous step.

Additionally, campaign co-pilot may also generate and send an API request 404 to a dialing system 121. The API request may comprise information indicating the outbound call campaign to be initiated and other relevant information. Creating an API request to a contact center dialer system to initiate an outbound call campaign can vary based on the specific dialer system and API design.

Provided is a generic example using HTTP POST with JSON:

```
POST/api/outbound-campaigns
Content-Type: application/json
Authorization: Bearer FOO_ACCESS_TOKEN
{
   "campaignName": "Upgrade Notification for December 2023",
   "campaignType": "outbound",
   "targetListId": "56789",//ID of the contact list to be used
   "scriptId": "12345",//ID of the call script to be used
   "callerId": "+15555555555",//Outbound caller ID
   "callRate": 5,//Number of calls to be made per agent per minute
   "startTime": "2023-12-01T09:00:00",//Start time of the campaign
   "endTime": "2023-12-01T18:00:00"//End time of the campaign
}
```

In this example the API request uses the HTTP POST method to initiate an outbound call campaign. The/api/outbound-campaigns represents the endpoint specific to creating outbound call campaigns. The actual endpoint may vary based on the contact center dialer system's 121 API design. The request body includes details about the outbound call campaign. It specifies the campaignName, campaignType (outbound in this case), targetListId representing the contact list to be used, scriptId representing the call script to be used, callerId as the outbound caller ID, callRate indicating the number of calls per minute per agent, startTime and endTime specifying the duration of the campaign. In this way, campaign co-pilot can respond to a request in a response, wherein the request is related to an outbound call campaign.

API requests may comprise a Uniform Resource Locator (URL) as a component. The URL is used to specify the endpoint or resource on the server (e.g., contact center) that the API request is targeting. The structure of the URL can vary based on the API design and the specific functionality being invoked. In a standard HTTP-based API request, the URL usually includes the following elements: scheme, host, port, path, and query parameters. The campaign co-pilot 102 may be trained to generate URLs for API requests by implementing one or more of the previously described elements. The server processes the URL to determine the specific action or data retrieval requested by the API call. The HTTP method (e.g., GET, POST, PUT, DELETE) used in conjunction with the URL further defines the nature of the API request. It's important to note that some API designs may use additional elements such as headers and a request body (containing data in JSON, XML, or other formats) to convey information, especially in more complex or data-intensive operations. The URL, however, remains a fundamental component of API requests as generated by the platform's generative AI model, according to some embodiments.

Campaign co-pilot 102 can be further configured to generate a response to the received prompt. The response may be a text-based response generated by a generative AI model and based on analysis and processing of the prompt. For example, the campaign-co-pilot may generate a response such as "I've created the campaign you requested." or "The upgrade notification campaign has been created and ready to be executed at the set time" or other types of responses. A response may also include a follow-up message if campaign co-pilot needs more information to satisfy the prompt, or to ask the user if there is anything else they need assistance with. The generated response data 405 may be sent to a user interface 106 where it may be displayed and presented to the entity which submitted the prompt. The user interface 106 may include a display and means to provide input (prompts) to platform 100 such as a keyboard and mouse and/or a microphone and speech-to-text conversion systems. In this way, campaign co-pilot 102 may communicate with various contact center components to facilitate an action associated with an outbound call campaign and responsive to a received prompt.

Figure 5:
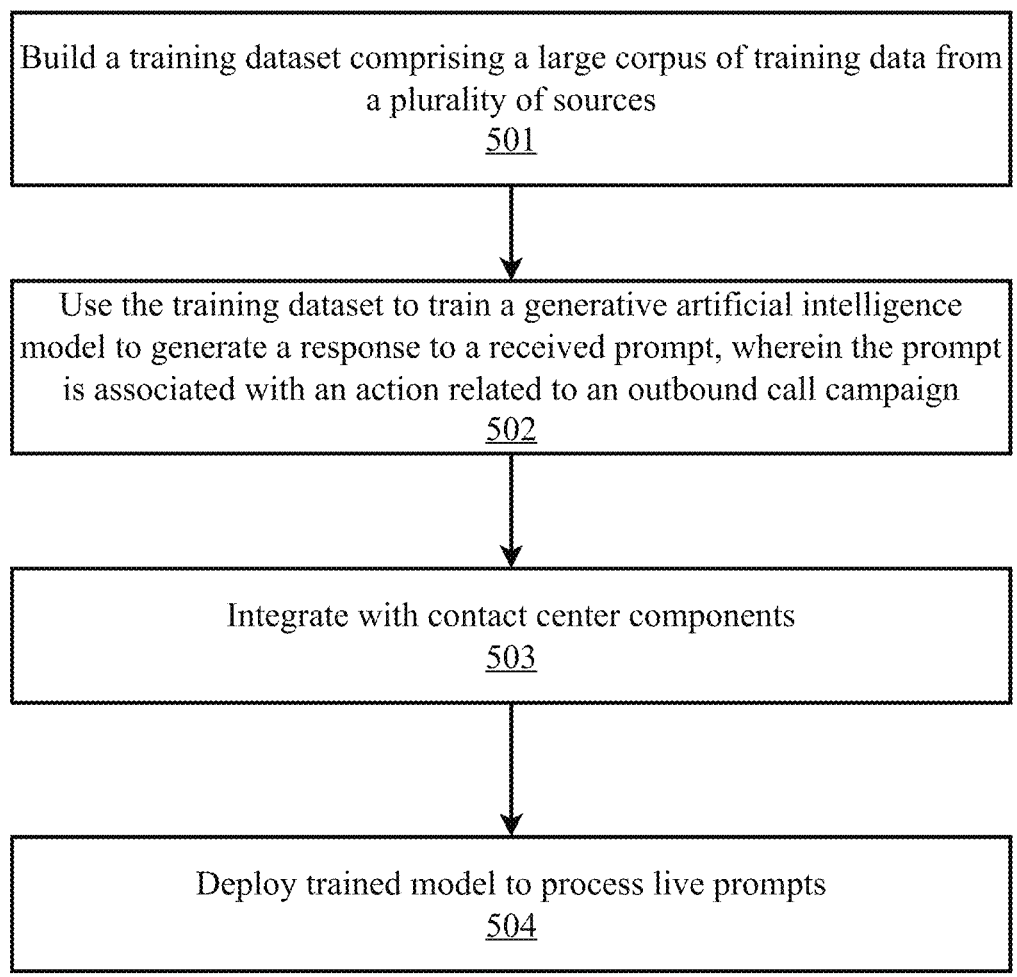
FIG. 5 is a flow diagram illustrating an exemplary method for training a generative AI model configured to aid with outbound call campaigns in a contact center environment, according to an embodiment.

FIG. 5 is a flow diagram illustrating an exemplary method 500 for training a generative AI model configured to provide assistance with outbound call campaigns in a contact center environment, according to an embodiment. The following steps may be performed by a training module or another component of platform 100, or some combination thereof. According to the embodiment, the process begins at step 501 when training module creates a training dataset comprising a large corpus of training data from a plurality of sources. The plurality of sources can include, but is in no way limited to, call transcriptions, campaign scripts, historical campaign data and campaign details, compliance rules, component data, API frameworks, CRM data, expert feedback, annotated prompts and corresponding actions, and/or the like. The training data may be pre-processed and/or transformed as necessary to be used as input into one or more machine and/or deep learning algorithms. In an embodiment, the one or more machine and/or deep learning algorithms comprise a generative artificial intelligence model. In some embodiments, the generative AI model may be a trained LLM model.

At step 502, training module can use the training dataset to train a generative artificial intelligence model to generate a response to a received prompt, wherein the prompt is associated with an action related to an outbound call campaign. In an embodiment wherein the generative AI model is an LLM, the model may be trained by feeding the training dataset into the LLM. The LLM may be trained to process an input prompt by first tokenizing the input prompt, embedding each token into a high-dimensional vector space thereby capturing the semantic meaning of words and components and their relationships, and contextualizing the entire input. Given the context, the LLM is trained to generate the next token in the sequence with final output a sequence of tokens that represents the model's predictions for the continuation of the input prompt. The generated token sequence is then decoded into natural language and the output is post-processed to extract relevant information. The LLM's ability to generate a coherent and contextually appropriate response is a result of its training on vast amounts of diverse data, enabling it to learn patterns, relationships, and context during the pre-training phase.

The model may also be trained on contact center component/system/process rules, frameworks, documentation, system information, etc. to learn the relationship between an outbound call campaign associated action and the components/processes responsible for executing said action. For example, the training data may include API framework documentation for contact center components such that the LLM model may learn to generate an API request/call to the appropriate endpoint responsible for the execution of the action associated with the API request. The model may be trained on a plurality of potential prompts and corresponding actions to be taken. This would represent an annotated training dataset which can be enhanced with expert feedback via the annotation process. Contact center's often have a senior employee who has a lot of experience, industry knowledge, and the technical savvy with respect to the contact center's software/hardware architecture, and these employees may provide their expert analysis to the training dataset.

APIs and SDKs may be included in the training data to help integrate the LLM with contact center components at step 503. Integration with contact center components may be implemented via APIs developed for contact center components and/or by using the information in SDKs to interact with contact center components. In some embodiments, an API manager may be present and configured to integrate the generative AI model with various contact center components via a plurality of APIs, which can include one or more bespoke APIs for providing an interface between the trained generative AI model and the contact center components.

As a last step 504, the trained model may be deployed to process live prompts in a production environment.

Figure 6:
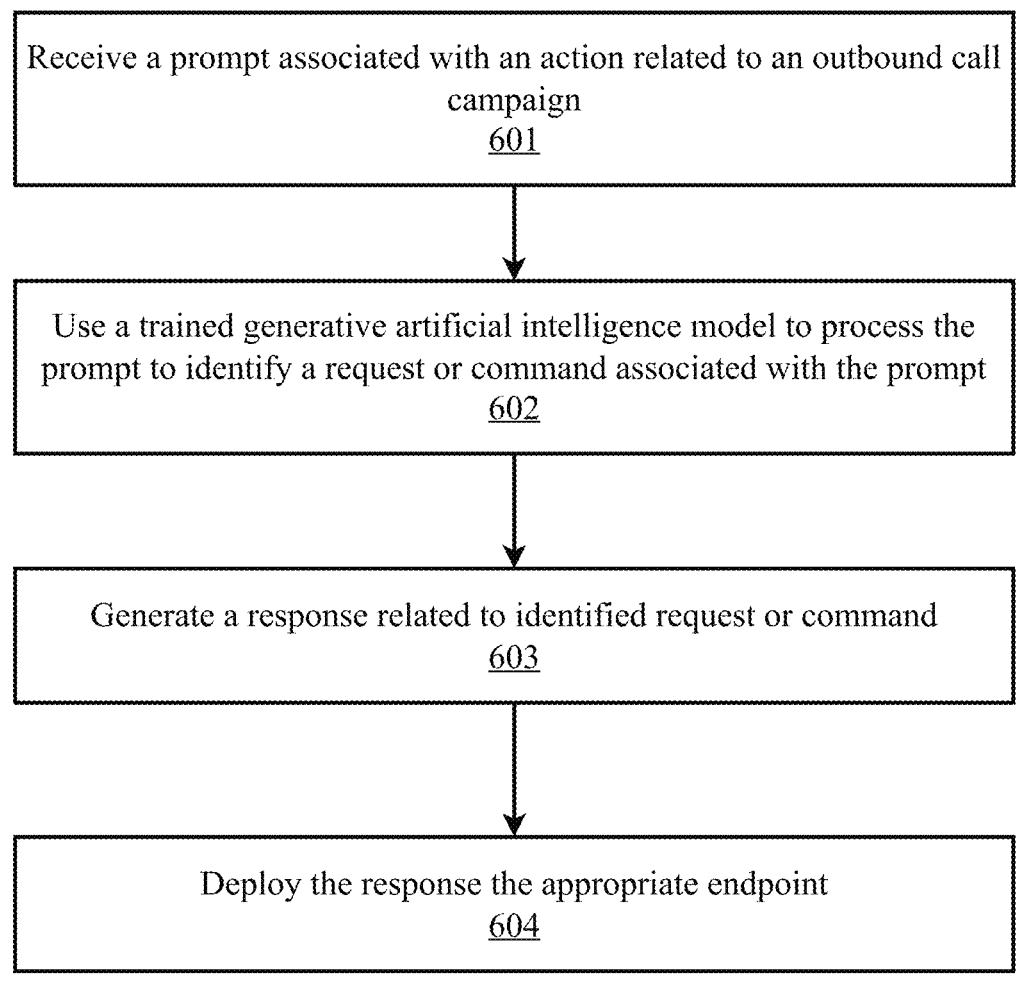
FIG. 6 is a flow diagram illustrating an exemplary method for managing an outbound call campaign using a generative artificial intelligence, according to an embodiment.

FIG. 6 is a flow diagram illustrating an exemplary method 600 for managing an outbound call campaign using a generative artificial intelligence, according to an embodiment. According to the embodiment, the process begins at step 601 when campaign co-pilot 102 receives a prompt associated with an action related to an outbound call campaign. A prompt may be associated with an action a simple as adding a contact to dial list, to the more complicated action of creating a new call campaign bound by many constraints. Types of prompts that can be created and processed by campaign co-pilot 102 can include the following (non-limiting) examples, "Create a Campaign named December 2023 payment reminder. Call contacts from Enterprise A who are past due for more than 2 days. Send the reminder to them through text", "Create a campaign named Emergency Notification. Call contacts from Service now who have tickets regarding service disruption in zip code 08540. Call and inform them on their primary contact number that due to snow the underground cables is cut. The team are working on restoring the connection and service should resume of 5 PM eastern today. Also send them this message as text and email", "Update Jane Doe email to janeDoe@example.com", or "Set abandon ratio for Summer Sales campaign to 2%".

At step 602 campaign co-pilot 102 uses a trained generative AI model is used to process the received prompt to identify a request or command associated with the prompt. The trained generative AI model may be a trained LLM model. The trained generative AI model may parse the received prompt via tokenization and embedding to determine any semantic relationships contained therein to identify one or more requests and/or commands contained within the prompt. For example, if the prompt was "Set abandon ratio for Summer Sales campaign to 2%" then the AI model can identify the request as updating an existing campaign or updating a campaign attribute. The identified request/command may be associated with one or more contact center components, which the generative AI model learned during model training. The identified request/action may be used to generate an appropriate response at step 603. The generative AI model may generate a response that may comprise one or more generated API requests to one or more contact center endpoints. The generative AI model may generate a response that further comprises a text-based message to be displayed via an interface to the entity which submitted the input prompt. For example, if the prompt was "Set abandon ratio for Summer Sales campaign to 2%" then the AI model generate a response that includes a API request to a campaign management system 128 operating at a contact center, the API request comprising instructions to set the abandon ratio to 2% for the campaign identified as Summer Sales, and also includes a message sent via the interface indicating that the request has been addressed. For example, the generated response may include a message displayed via user interface that states "I've set the abandon ratio to the requested threshold. Is there anything else I can assist you with?"

The generated response may include more than one API request, depending upon the context of the received prompt and the component architecture available to a given contact center. The generated response may ask the user for more information or a follow-up question. As a last step 604, the generated response is deployed to the appropriate endpoint. A text-based response may be sent to a user interface for display to the user. An API request may be sent via communication network to the appropriate contact center component. In some implementations, platform 100 may comprise an API manager configured to receive API requests from campaign co-pilot 102 and route them to the appropriate endpoint via APIs.

Figure 7:
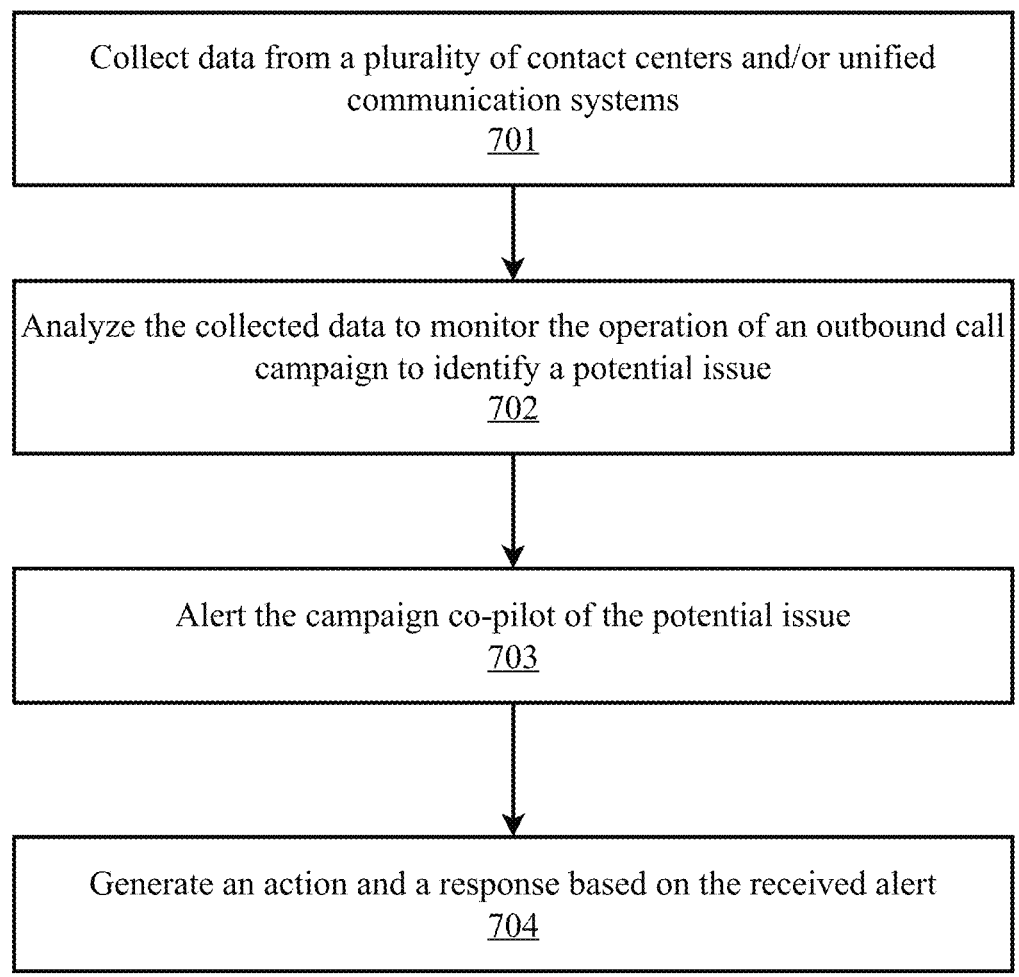
FIG. 7 is a flow diagram illustrating an exemplary method for using a predictive engine to create an alert prompt to a generative AI model, according to an embodiment.

FIG. 7 is a flow diagram illustrating an exemplary method 700 for using a predictive engine to create an alert prompt to a generative AI model, according to an embodiment. According to the embodiment, the process begins at step 701 when a prediction engine 104 integrates with one or more contact centers and/or unified communication systems to collect a plurality of data associated with contact center and campaign operations. Prediction engine 104 may analyze the collected data to monitor the operation of an outbound call campaign to identify a potential issue at step 702. Examples of potential issues can include, but are not limited to, low answer rate, high call dropout rate, negative responses and rejections, compliance issues, low conversion rates, and/or the like. Monitoring and addressing these issues proactively can significantly improve the effectiveness of outbound call campaigns and enhance overall customer engagement. Regularly collecting and analyzing data, along with continuous refinement of strategies, are key components of successful outbound calling initiatives. At step 703, predictive engine 104 may alert the campaign co-pilot 102 of the potential issue. The alert may be in the form of a prompt sent to campaign co-pilot 102. As a last step 704, the campaign co-pilot 102 may generate an action and a response based on the received alert.

Exemplary Computing Environment

Figure 8:
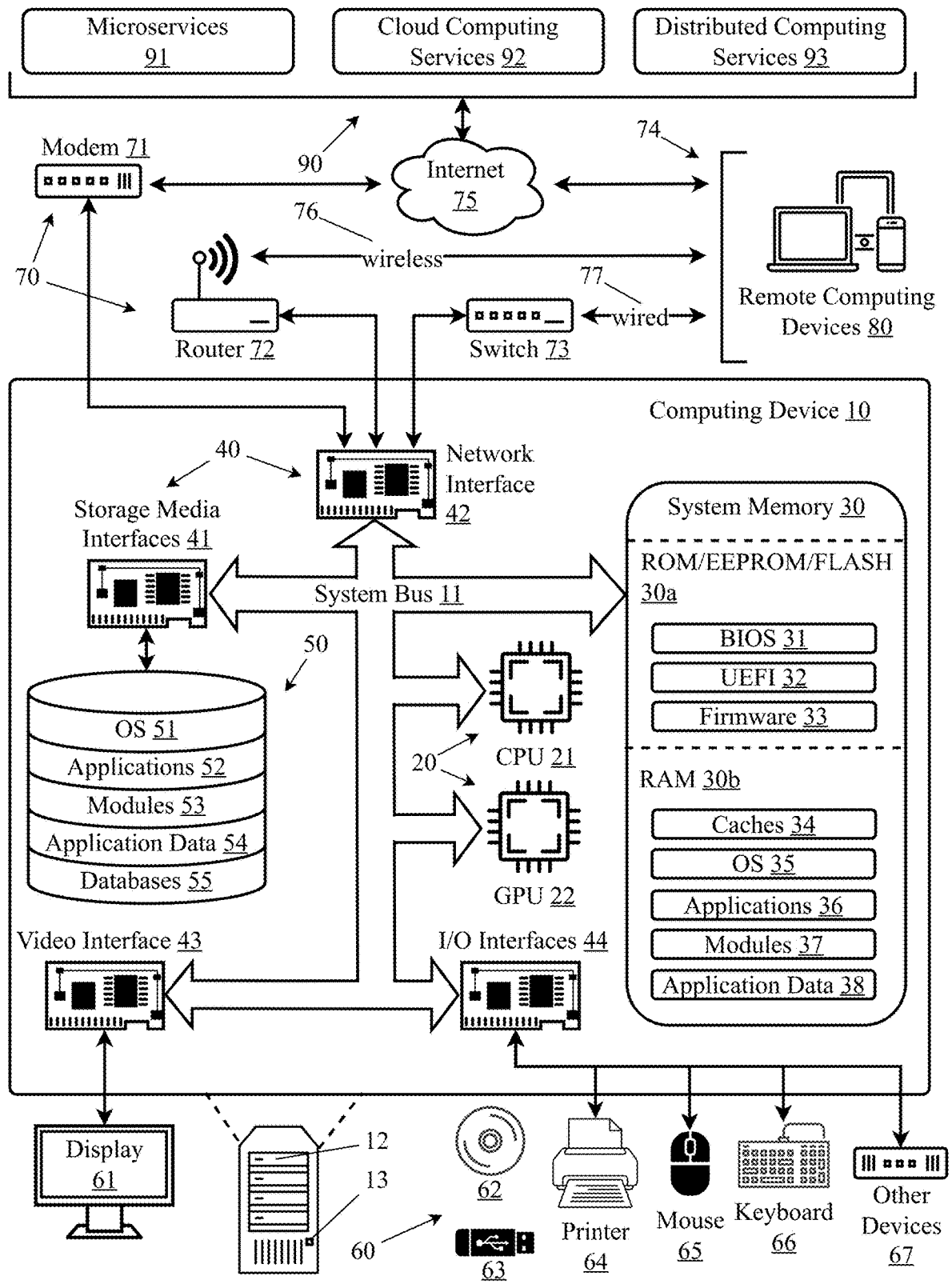
FIG. 8 illustrates an exemplary computing environment on which an embodiment described herein may be implemented.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for outbound call campaign management using generative artificial intelligence, comprising:
   a computing device comprising a processor, a memory, and a non-volatile data storage device;
   a campaign co-pilot service comprising a first plurality of programming instructions stored in the memory which, when operating on the processor, causes the computing device to:
   receive a prompt, the prompt comprising a natural language request associated with an outbound call campaign;
   process the prompt using a trained large language model to identify one or more actions associated with the request;
   generate a response comprising one or more application programming interface (API) requests to one or more contact center endpoints, wherein the API requests to the appropriate contact center endpoints;
   generate a text-based response based on the identified actions; and
   display the text-based response on a user interface.

2. The system of claim 1, wherein the response is text-based.

3. The system of claim 1, wherein the action is directed to the outbound call campaign.

4. The system of claim 1, wherein the action comprises at least one application programming interface (API) request, wherein the API request is generated by the generative artificial intelligence model.

5. The system of claim 4, wherein the API request comprises a uniform resource locator generated by the generative artificial intelligence model, the model optionally using additional inputs from interface and configuration data maintained by the system.

6. The system of claim 4, wherein the API request is delivered to the contact center system.

7. The system of claim 6, wherein the action is executed by the contact center system by fulfilling the API request.

8. The system of claim 1, wherein the generative artificial intelligence model is a trained large language model.

9. The system of claim 1, wherein the action is directed to administering one or more outbound campaigns to be executed via one or more of voice calls, text messages, emails, mobile pushes, and social media channel posts.

10. The system of claim 1, further comprising a training module comprising a second plurality of programming instructions stored in the memory which, when operating on the processor, causes the computing device to:
    build a training dataset comprising a plurality of information related to at least outbound call campaigns and contact center components and systems; and
    use the training dataset as an input to a deep learning algorithm to create the generative artificial intelligence model.

11. The system of claim 1, wherein the contact center system is a campaign management system, a dialer system, a customer relationship management system, or a list management system.

12. A method for outbound call campaign management using generative artificial intelligence, comprising the steps of:
    receiving a prompt, the prompt comprising a natural language request associated with an outbound call campaign;
    processing the prompt using a trained large language model to identify one or more actions associated with the request;
    generating a response comprising one or more application programming interface (API) requests to one or more contact center endpoints, wherein the API requests to the appropriate contact center endpoints;
    generating a text-based response based on the identified actions; and
    displaying the text-based response on a user interface.

13. The method of claim 12, wherein the response is text-based.

14. The method of claim 12, wherein the action is directed to the outbound call campaign.

15. The method of claim 12, wherein the action comprises at least one application programming interface (API) request, wherein the API request is generated by the generative artificial intelligence model.

16. The method of claim 14, wherein the API request comprises a uniform resource locator generated by the generative artificial intelligence model, the model optionally using additional inputs from interface and configuration data maintained by the system.

17. The method of claim 14, wherein the API request is delivered to the contact center system.

18. The method of claim 16, wherein the action is executed by the contact center system by fulfilling the API request.

19. The method of claim 12, wherein the generative artificial intelligence model is a trained large language model.

20. The method of claim 12, wherein the action is directed to administering one or more outbound campaigns to be executed via one or more of voice calls, text messages, emails, mobile pushes, and social media channel posts.

21. The method of claim 12, further comprising the steps of:
- building a training dataset comprising a plurality of information related to at least outbound call campaigns and contact center components and systems; and
- using the training dataset as an input to a deep learning algorithm to create the generative artificial intelligence model.

22. The method of claim 12, wherein the contact center system is a campaign management system, a dialer system, a customer relationship management system, or a list management system.

* * * * *